(12) United States Patent
Haraldsson et al.

(10) Patent No.: US 7,500,796 B2
(45) Date of Patent: Mar. 10, 2009

(54) ACCESSORY FOR A CAMERA BODY AND A CAMERA BODY WITH DETECTION AND INITIATION OF THE STATUS OF ATTACHED ACCESSORIES

(75) Inventors: Roland Haraldsson, Kungsbacka (SE); Tommy Killander, Göteborg (SE); Stefan Lundgren, Göteborg (SE)

(73) Assignee: Victor Hasselblad AB (SE)

( * ) Notice: Subject to any disclaimer, the term of this patent is extended or adjusted under 35 U.S.C. 154(b) by 333 days.

(21) Appl. No.: 10/527,266

(22) PCT Filed: Sep. 8, 2003

(86) PCT No.: PCT/SE03/01386

§ 371 (c)(1),
(2), (4) Date: Mar. 9, 2005

(87) PCT Pub. No.: WO2004/023207

PCT Pub. Date: Mar. 18, 2004

(65) Prior Publication Data

US 2006/0034606 A1 Feb. 16, 2006

(30) Foreign Application Priority Data

Sep. 9, 2002 (SE) .................................. 0202643

(51) Int. Cl.
*G03B 17/00* (2006.01)

(52) U.S. Cl. ........................ 396/529; 396/439; 396/544; 348/300; 348/375

(58) Field of Classification Search .................. 396/529
See application file for complete search history.

(56) References Cited

U.S. PATENT DOCUMENTS

| | | | | |
|---|---|---|---|---|
| 4,217,606 A | * | 8/1980 | Nordmann | 348/151 |
| 4,673,275 A | * | 6/1987 | Nakai et al. | 396/439 |
| 4,782,355 A | | 11/1988 | Sakai et al. | |
| 4,814,802 A | * | 3/1989 | Ogawa | 396/318 |
| 4,845,522 A | * | 7/1989 | Kataoka | 396/439 |
| 4,969,000 A | * | 11/1990 | Ohara et al. | 396/388 |
| 4,994,844 A | * | 2/1991 | Azuma et al. | 396/211 |
| 5,060,005 A | * | 10/1991 | Itoh et al. | 396/303 |
| 5,122,880 A | * | 6/1992 | Nagano | 348/333.13 |

(Continued)

FOREIGN PATENT DOCUMENTS

GB 2 299 866 A 10/1996

*Primary Examiner*—W. B. Perkey
*Assistant Examiner*—Warren K Fenwick
(74) *Attorney, Agent, or Firm*—Lerner, David, Littenberg, Krumholz & Mentlik, LLP (57) ABSTRACT

The invention relates to a camera body (CB) for still photography that comprises attachment facilities for a number of different accessories (ACC), which camera body further comprises a control unit for controlling functions in the camera body and in accessories attached to the camera body. The control unit communicates with the various accessories via a data bus, and, for at least one of the attachment facilities for accessories, in addition to the data bus, the camera body comprises separate means for communication (1, 2, 3, 4, 5) for detecting accessories that are attached or removed, which means for communication can also be used by the control unit in the camera body to initiate a change in the system status of an attached accessory. The invention also relates to an accessory for such a camera body.

2 Claims, 5 Drawing Sheets

U.S. PATENT DOCUMENTS

| | | | |
|---|---|---|---|
| 5,287,138 A * | 2/1994 | Shiokama et al. | 396/301 |
| 5,300,978 A * | 4/1994 | Miyasaka | 396/300 |
| 5,333,030 A * | 7/1994 | Kikukawa et al. | 396/303 |
| 5,406,347 A * | 4/1995 | Saegusa | 396/281 |
| 5,481,326 A * | 1/1996 | Yasukawa | 396/529 |
| 5,548,369 A * | 8/1996 | Iijima | 396/71 |
| 5,664,245 A * | 9/1997 | Kurihara et al. | 396/303 |
| 5,761,560 A * | 6/1998 | Miyazawa et al. | 396/532 |
| 5,781,818 A * | 7/1998 | Kobayashi | 396/529 |
| 6,041,189 A * | 3/2000 | Izukawa | 396/277 |
| 6,183,145 B1 * | 2/2001 | Aihara et al. | 396/529 |
| 6,341,902 B1 * | 1/2002 | Sato et al. | 396/529 |
| 6,352,378 B1 * | 3/2002 | Izukawa | 396/529 |
| 6,690,415 B1 * | 2/2004 | Mamiya | 348/207.1 |
| 6,707,992 B2 * | 3/2004 | Uenaka et al. | 396/71 |
| 6,738,574 B2 * | 5/2004 | Nishida et al. | 396/87 |
| 6,839,511 B2 * | 1/2005 | Nishida et al. | 396/87 |
| 7,151,570 B2 * | 12/2006 | Kaneda | 348/360 |
| 2002/0021898 A1 * | 2/2002 | Teramoto | 396/310 |
| 2002/0101520 A1 * | 8/2002 | Milam | 348/232 |
| 2002/0118972 A1 * | 8/2002 | Uenaka et al. | 396/532 |
| 2003/0142970 A1 * | 7/2003 | Nishida et al. | 396/155 |
| 2004/0202464 A1 * | 10/2004 | Miyasaka et al. | 396/529 |

* cited by examiner

ACCESSORY FOR A CAMERA BODY AND A CAMERA BODY WITH DETECTION AND INITIATION OF THE STATUS OF ATTACHED ACCESSORIES

TECHNICAL FIELD

The present invention relates to a camera body comprised in a modular system for photography, where a large number of different accessories such as lenses, flash units, magazines, etc, can be attached to the camera body. The invention also relates to an accessory comprised in such a modular system.

BACKGROUND ART

The central unit in a modular camera system consists of a camera body which can be combined with a large number of accessories of different types, for example lenses, flash units and magazines of various types. These accessories must be able to be attached and removed in principle at any time, irrespective of the state of other attached components in the system. In the camera body there is a control unit for controlling the camera body and attached accessories, which control unit requires information regarding which different types of accessory are attached in order to be able to control the system correctly. It is therefore important that this control unit receives information in a quick and reliable way regarding which accessories are attached and, of course, also if a particular accessory is removed.

If an accessory is attached when the camera system is switched off or in an energy-saving mode it is also important that the exchange of information between this accessory and the camera's central control unit is carried out as soon as the accessory has been attached. If the exchange of information between the camera's central control unit and the newly-attached accessory has to wait until the photographer switches the camera on, this can delay his ability to use the camera at the required time. In the same way, it is, of course, important that the control unit receives information that a particular accessory has been removed, irrespective of whether this is carried out while the camera is switched on, switched off or in energy-saving mode.

DISCLOSURE OF THE INVENTION

There is thus a wish to improve the communication facilities between a camera body in a modular system and the units or accessories that can be attached to the camera body. This wish is met by the present invention in that it describes a camera body for still photography that comprises attachment facilities for a number of different accessories, and further comprises a control unit for controlling functions in the camera body and in accessories attached to the camera body. The control unit communicates with the various accessories via a data bus, and the camera body can be in at least two different system states when an accessory is attached to it.

For at least one of the attachment facilities for accessories, the camera body comprises, in addition to and separate from the data bus, separate communication means for automatic detection of the attachment or removal of accessories to or from the camera body regardless of which of said system states the camera body is in. These separate means for communication can also be used by the control unit in the camera body to initiate a change in the system status of an attached accessory.

As the means for detecting and changing the system status are separate from the data bus, they can be designed in a way that makes them extremely energy-efficient, which makes it possible for them to be permanently active, irrespective of the state of the camera system. This means that the central control unit in the camera body can continually be updated regarding changes in attached accessories, which saves time for the photographer.

Said separate means for communication suitably also have the ability to cause a change in the system status of the camera body and attached accessories to be initiated by an attached accessory.

The invention also comprises an accessory for a camera body, preferably the camera body mentioned earlier, comprising means for control and means for connection to a data bus in said camera body, and comprises, in addition, separate communication means for connection to corresponding separate communication means in the camera body for monitoring by the camera body of the system status of the accessory. The separate means for communication can also be used by control means in the accessory to initiate a change the system status of the accessory.

The separate means for communication in an accessory according to the invention can suitably also be used by the accessory's control means to request initiation of changes in the system status of the camera body and other units that are attached to the camera body.

BRIEF DESCRIPTION OF THE DRAWINGS

The invention will be described in greater detail below, in the form of examples of embodiments, with reference to the attached drawings, in which.

MODES FOR CARRYING OUT THE INVENTION

The invention comprises, among other things, a camera body that is part of a modular camera system. A large number of different accessories of different types can be attached to the camera body, such as, for example, different types of lenses, flash units, viewfinders, etc. The communication between the camera body and the attached accessories is normally carried out by means of a data bus between a control unit, for example a processor, in the camera body and a control unit in the respective accessory.

The data bus has a relatively high energy consumption, which means that it is not suitable to have it continually active. In order still to ensure that there is communication between the camera body and attached accessories in certain situations, a camera body according to the invention, in addition to the data bus, comprises separate means for automatically detecting that an accessory is attached to the camera body or is removed from it, and for initiating a change in system status. Said change in system status can, according to the invention, be initiated by a control unit in the camera body. In one embodiment of the invention, such a change in system status can, in way which will also be described herein, be initiated by an attached accessory.

Figure 1:
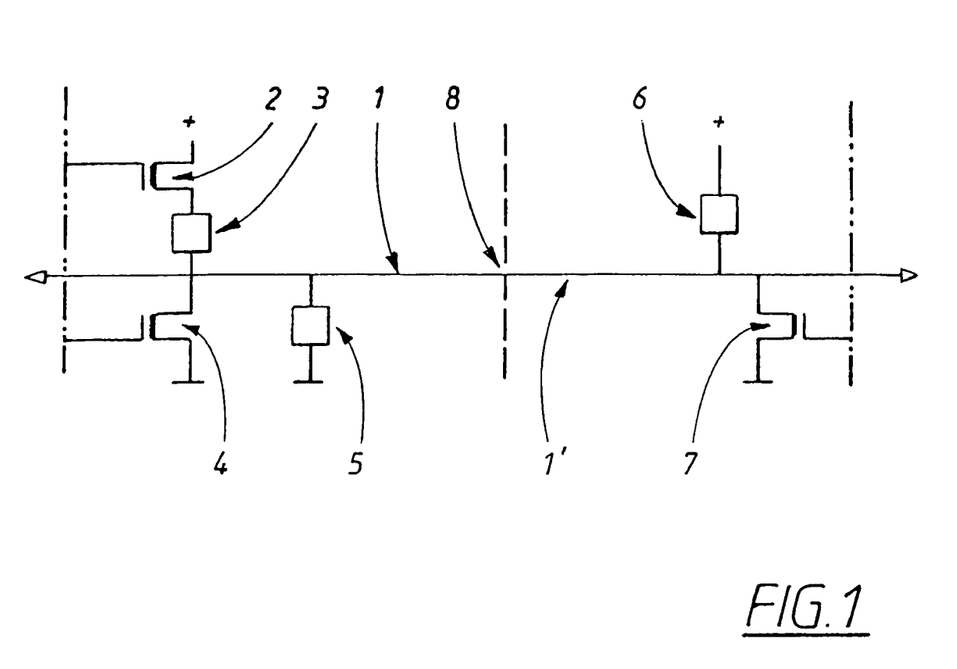
FIG. 1 shows a principal solution in a camera body according to the invention.

The attachment of accessories, including the automatic detection by the camera body of said attachment, and removal of accessories will be described first, with reference to FIG. 1:

FIG. 1 shows in summary a part of the said separate means, a connection 1-1' in a camera body according to the invention: an accessory, ACC, is attached to a camera body CB. The camera body exchanges data messages with the accessory via a data bus (not shown), and is, in addition to the data bus, also connected to the accessory via the separate connection 1-1', the point of attachment between the camera body and the accessory being shown by a broken line 8 in FIG. 1.

The separate means for communication according to the invention also comprise interface circuits which are used to control the separate connection 1-1' as follows: On the camera body side, the interface circuits comprise a first transistor 2, preferably a p-channel field-effect transistor (FET), connected in series to a first resistor 3 which is connected to the connection 1. The transistor is also connected to a voltage source, with the transistor's source being connected to the voltage source and the transistor's drain being connected to the resistance 3.

The resistance 3 is connected to ground via a second transistor 4, which is also preferably a field effect transistor, however of the n-channel type, which is connected to the resistance 3 by its drain and to ground by its source. In parallel with the second transistor 4, the cable 1 is also connected to ground via a second resistance 5. The first transistor 2 and the second transistor 4 are connected to a control unit in the camera body via their control voltage (gate in the case of field-effect transistors, irrespective of whether these are n- or p-channel transistors.)

Before the attachment of ACC, the connection 1-1' between CB and ACC is disconnected at the point 8. The control unit in the camera body causes the transistor 2 to become conductive, and according to the invention the resistance 3 is designed with a relatively low resistance and the resistance 5 has a relatively high resistance, which means that the level of the cable 1 will be high, as the transistor 4 is caused to be non-conductive.

The precise size of the resistances in the resistances 3 and 5 is not of central importance for the invention, however it is important that the resistance 3 has a considerably smaller resistance than the resistance 5. As an example, it can, however, be mentioned that the resistance 5 can be of the order of 10-100 times larger than the resistance 3, and that the resistance can be dimensioned with the resistance 3 being approximately 100 kΩ, so that the resistance 5 should consequently be approximately 1-10 MΩ.

The control unit in the camera body monitors the voltage level of the cable 1, preferably by the cable 1 being connected to a so-called "interrupt" input in the control unit.

When ACC is attached, the separate cable 1 in the camera body is connected to a corresponding separate cable 1' in ACC, where the separate cable 1' in ACC is connected to a control unit (not shown) in ACC, suitably via an "interrupt" in a processor in ACC, whereby the processor in ACC can monitor the level of the cable 1-1'. ACC also comprises a number of interface circuits for communication via the cable 1', which in the example in FIG. 1 consists of a resistance 6 which is connected between a voltage source and the cable 1', and a transistor 7, suitably a n-channel field-effect transistor. The transistor 7 is connected by its drain to the cable 1', and is connected by its source to ground. The transistor's control voltage, the gate, is connected to the control unit in ACC.

Upon the attachment of ACC, ACC gets a voltage supply from the camera body via a separate connection (not shown) for this. According to the invention, the resistance 6 has a relatively low resistance, of the same order of size as the resistance 3, in this case 100 kΩ, and the transistor 7 that has a control voltage that is connected to a control unit in ACC is caused by the control unit in ACC to be non-conductive, which means that no change takes place in the state (high) of the cable 1.

After it has been provided with voltage, ACC starts up and goes through its internal start-up routines. ACC's internal control unit causes the transistor 7 to become conductive, which means that the level of the cable 1-1' is changed to low. This change in level is detected by the processor in CB, which causes the transistor 2 to become non-conductive and sends a message via the camera system's data bus (which may be "awakened" by the control unit if it were in a power down mode at the time) to the control unit in ACC to the effect that the level change in the cable 1-1' has been detected, which initiates an exchange of information on the data bus between the control units in ACC and CB, concerning, for example, identification from ACC. Thus, said separate means for communication have enabled the control unit in the camera body to automatically detect the attachment of the ACC, even if the data bus was not "powered up" at the time of the attachment.

After the reception of an identification message from ACC, the control unit in CB replies by sending a message via the data bus to ACC with a request for information from ACC about its characteristics and status. This request is received by ACC, and its control unit confirms the reception by replying with the requested information via the data bus. The control unit in CB sends a message to ACC concerning which system status is to apply, which in a preferred embodiment is carried out last in the exchange of information on the data bus. In association with the exchange of information on the data bus, the control unit in ACC makes the transistor 7 non-conductive, whereupon the level of the cable 1-1' is changed to high.

In a "normal mode", in other words when ACC is attached, the transistors 2, 4 and 7 are thus non-conductive, which means that the level of the cable 1-1' is high.

Upon the removal of ACC, the following takes place: with ACC attached, the transistors 2 and 4 in CB are non-conductive, similarly the transistor 7 in ACC. When ACC is removed by the user, the connection 1-1' is broken at the point 8, which means that the voltage supply to the cable via the resistance 6 in ACC is discontinued. This means that the level of the cable 1-1' is changed to low due to the resistance 5 in CB, which is detected by the control unit in CB, which thereby obtains information to the effect that ACC has been removed, and can thus update the information about which accessories are attached to CB. The exact mechanism by means of which the control unit in CB deduces that the low level of the connection 1-1' means that ACC has been disconnected is described at a later point in this text.

When the control unit in CB detects that ACC has been removed, it causes the transistor 2 to be conductive again, whereupon the level of the cable 1-1' returns to being high, which means that CB is prepared for the attachment of a new ACC in accordance with what has been described above.

It has been described above how the attachment or removal of accessories to/from the camera body is detected using the separate means of determining the operating states, according to the invention of camera body (CB) circuit components shown as elements 1, 2, 3, 4 and 5 and accessory (ACC) elements 1', 6 and 7 of FIG.1.

The camera system in which the camera body and accessories according to the invention are included can be in a number of so-called system states and the said separate means can also be used when changing the system state, with the change being initiated either by the camera body or by an accessory attached to the camera body, which will be described below. The system states that are available at present are as follows:

"Active state": the camera is powered, immediate taking of photographs is possible.

"Standby/power down": power-saving sleep mode, taking of photographs is possible with a certain delay.

"Power off": nothing in the system is powered.

"Mag active": a special state which is only relevant for a film magazine that is attached to the camera body. In this state the magazine is powered, which means that the film can be fed forward. Other components in the system have a state that corresponds to "standby/power down".

In all the states listed above, all the components have so-called system voltage, in other words they are provided with a voltage that enables operation of logic circuits, for example microprocessors, etc. With a change to active state (or to "mag active" for magazines), in addition to this voltage, they are also provided with a further voltage supply for full function, for example for the operation of mechanical elements, charging of flash units and the like.

The states that have been listed above are those that can be foreseen at present for the system in question. Those skilled in the field will, however, recognize that the invention can be used for changes between practically any states.

Figure 2:
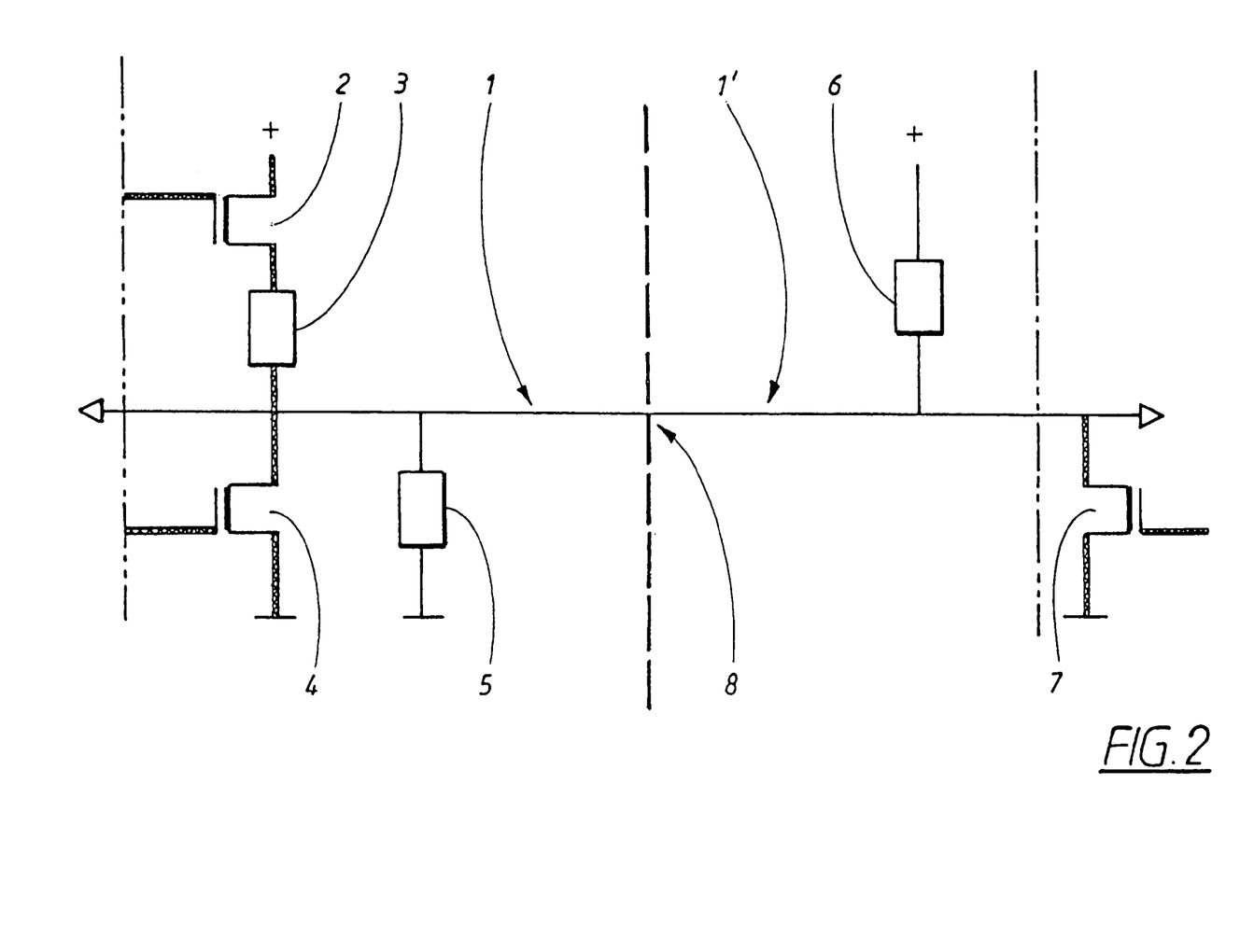
FIGS. 2-5 show a sequence in a more detailed description of the solution from FIG. 1.

FIG. 2 shows again the interface between CB and ACC in a "normal state". Components that have been caused by the respective control unit to become conductive are shown with dark lines, while the connections to components that have been caused to become non-conductive are shown by a lines with a filling. Thus in FIG. 2, the transistors 2 and 4 in CB and the transistor 7 in ACC are non-conductive, as is the resistance 3 in CB. On the other hand, the resistances 5 (CB) and 6 (ACC) are conductive.

Figure 3:
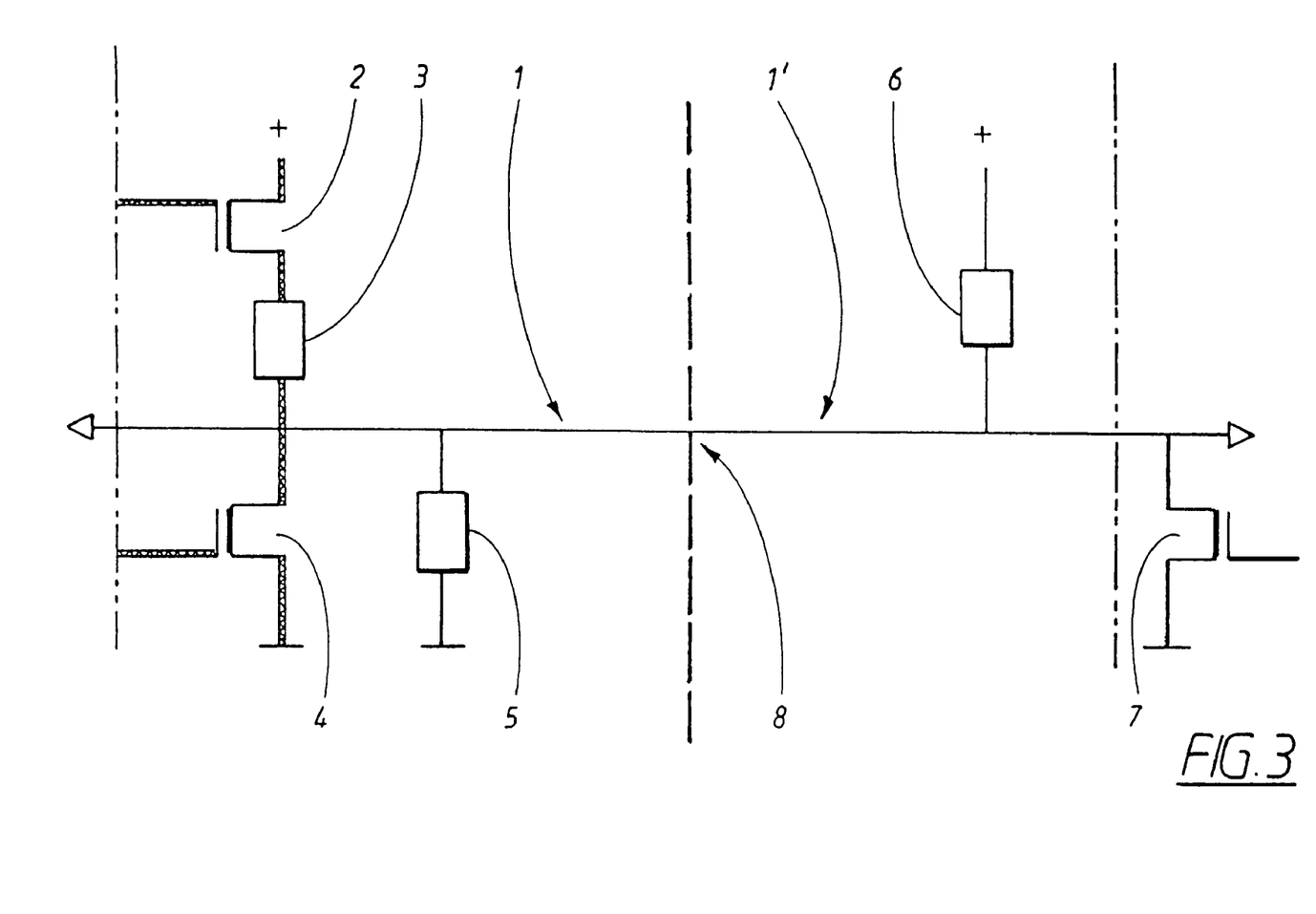

With reference to FIG. 3: When ACC wants to initiate a change in the system state, suitably of the camera as a whole, i.e. the camera body with the accessories attached, its control unit causes the transistor 7 to become conductive, which causes the voltage level of the cable 1-1' to become low, which is detected by the control unit in CB.

The low level of the cable can mean that ACC wants to initiate a change in system state or that ACC has been removed, according to what was described above. The control unit in CB must therefore first investigate the cause of the low level of the cable, which it does by connecting the resistance 3, which in turn is carried out by the transistor 2 being made conductive, see FIG. 4. If the detected change to low level is due to ACC having been removed, the level of the cable will be made high on account of these measures. As, in the example shown, ACC is still present, the level will instead remain low, due to the resistance 6 and the (conductive) transistor 7.

Figure 4:
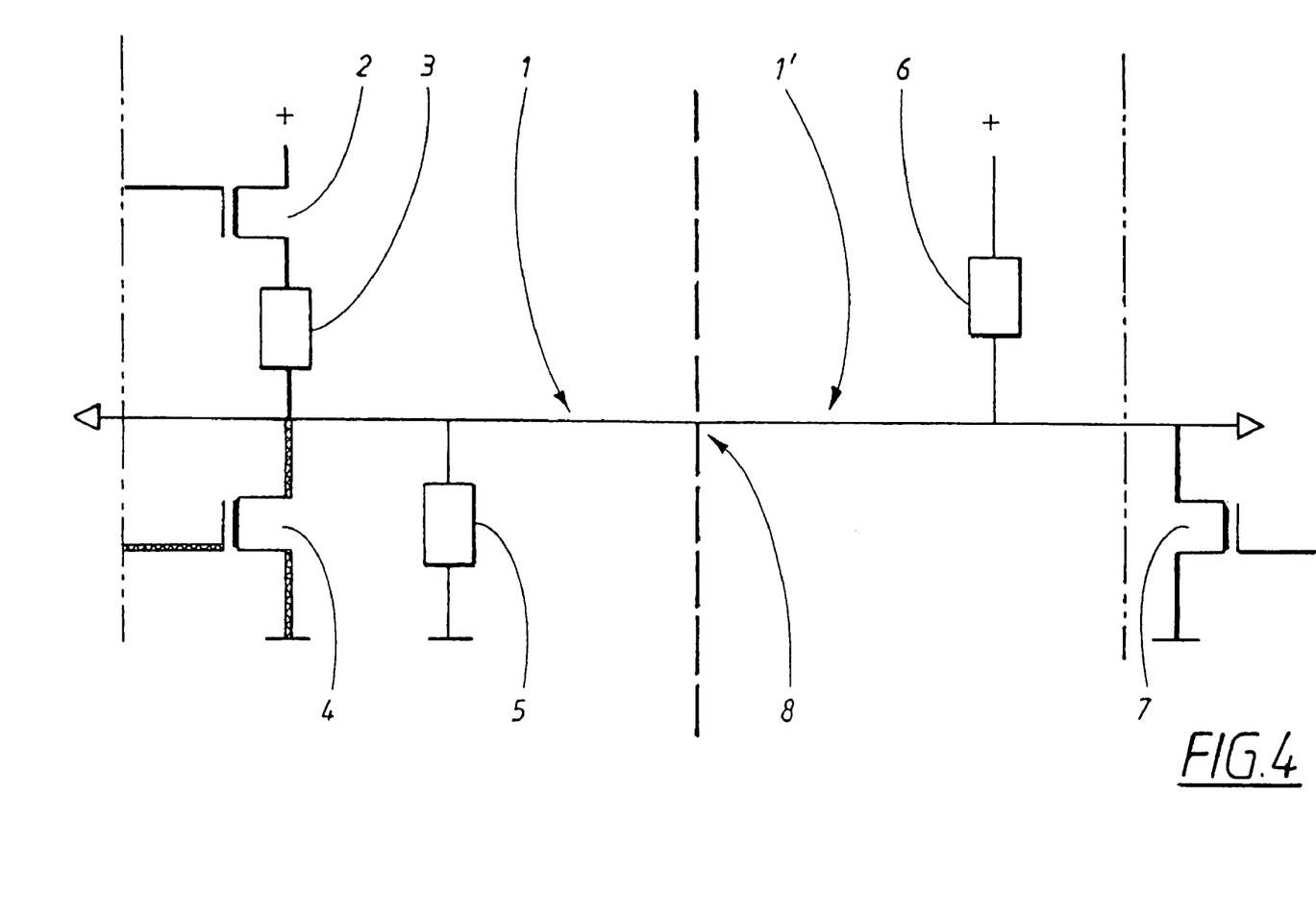

As the control unit in CB has now recognized that the change to low level in the cable 1-1' was due to ACC wanting to initiate a change in the system state, there can now be an exchange of messages concerning this change via the system's ordinary data bus. In a preferred embodiment, this is carried out by the control unit in CB sending an acknowledgement to ACC that the request for the system change has been understood, after which there is an exchange of messages concerning the required system change. In a preferred embodiment, CB sets all the other attached units to one and the same system state. As a consequence, one single accessory can change the system state of all the units in the system.

Figure 5:
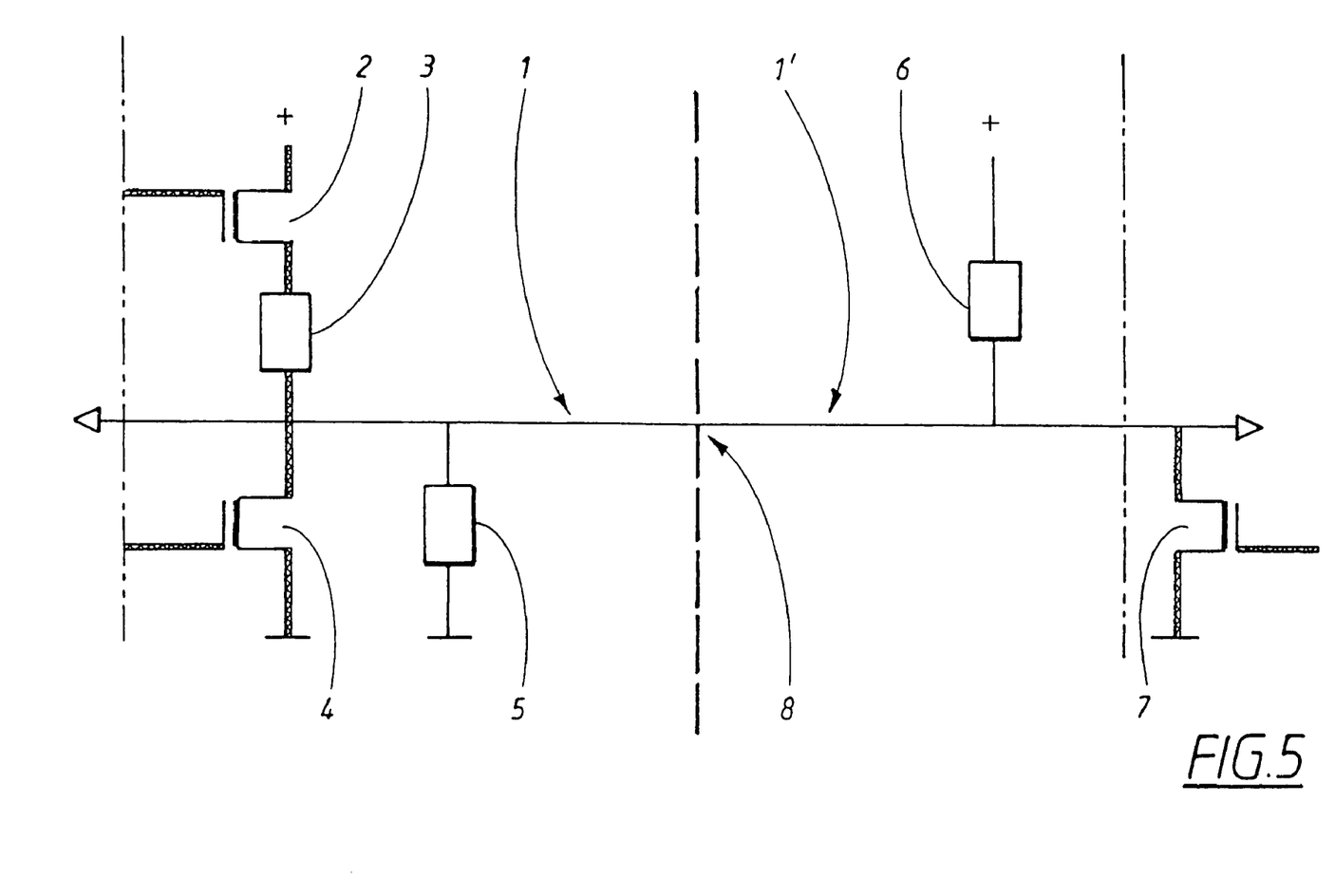

When the required exchange of messages is completed, the level of the cable 1-1' is reset to high, by the control unit in CB making the transistors 2 and 4 non-conductive, and the control unit in CB making the transistor 7 non-conductive. This means that the resistances 3 (CB) and 6 (ACC) also become non-conductive. The interface between CB and ACC thereupon returns to a normal state, which is shown in FIG. 5.

The separate communication means can also be used when CB wants to initiate a change in system status in ACC, which can be done individually for each ACC that the CB has the described separate communication means with. In a preferred embodiment, this is the case with all of the ACC's. The CB proceeds in the following manner: the control unit in CB makes the transistor 4 conductive, which causes the level of the cable 1-1' to become low. This "wakes" the control unit in ACC, which sends a message via the ordinary data bus to the control unit in CB, in which it confirms that ACC is ready to receive a message from CB concerning changed status.

Thereafter there is an exchange of messages concerning the new system status via the data bus, after which the control unit in CB makes the transistor 4 non-conductive again, which means that the level of the cable 1-1' returns to the normal state, in other words high.

In addition to the cases that have been described above, the separate means for communication according to the invention can be used for a number of other applications, two of which will be described below:

If, for example, a digital back with its own battery for some reason is not powered—for example, due to forgetfulness or malfunction—this will mean that exposures cannot be made. The fact that the film magazine is not powered also means that the level of the separate cable 1-1' will be low, which is not the normal state. The control unit in CB detects this, and if the low level of the cable to the magazine remains, a number of measures can be taken, for example a warning signal can be given to the photographer, warning text in the display, warning diodes, etc, or making exposures can quite simply be blocked as long as the problem remains. This monitoring of the state of an accessory, in this case the magazine, is simplified considerably by the means for communication according to the invention being separate for the accessory concerned.

A further possibility for using the separate means for communication according to the invention is as follows: certain accessories, for example digital backs, can require a relatively long start-up time, during which time they are not available for full function. The control unit in such an accessory can inform the control unit in CB of this by the control unit in the ACC in question changing the level of the cable 1-1' with a particular predetermined pattern, which is carried out by the control unit in ACC making the transistor 7 conductive (low level) and non-conductive (high level).

The control unit in CB will try to initiate the abovementioned ordinary method for attaching new accessories, but will not receive the "correct" reply from ACC, whereupon one or more measures are taken, for example those that were described above, in other words a warning signal is given to the photographer, warning text in the display, warning diodes, etc, or making exposures can quite simply be blocked until the level of the cable returns to normal. This continues until the control unit in CB receives the "correct" reply from ACC to the initiation procedure.

The invention claimed is:

1. A camera body for still photography comprising an attachment site for electronically coupling with an accessory;
   a control unit for controlling functions of the camera body and of the accessory, the camera body having at least two different system states;
   first communication means being a data bus for communicating between the camera body and the accessory; and
   second communication means being a separate connection comprising an interface circuit for automatic detection of the attachment or removal of the accessory, the control unit of the camera body adapted for changing the system state through the second communication means, wherein the system state for the camera body is not altered during the automatic detection of the attachment or removal of the accessory, and wherein the accessory has a separate output that is changed to a low output state when the accessory has gone through its internal start-up routine and wherein the automatic detection of the attachment or removal of the accessory is done regardless of the system state of the camera body.

2. A camera body for still photography comprising an attachment site for electronically coupling with an accessory;

a control unit for controlling functions of the camera body and of the accessory, the camera body having at least two different system states;

first communication means being a data bus for communicating between the camera body and the accessory; and second communication means being a separate connection comprising an interface circuit for automatic detection of the attachment or removal of the accessory, the control unit of the camera body adapted for changing the system state through the second communication means, wherein the system state for the camera body is not altered during the automatic detection of the attachment or removal of the accessory, and wherein the two system states include an off state and an on state, and wherein the automatic detection of the attachment or removal of the accessory is done regardless of the system state of the camera body.

\* \* \* \* \*

(12) INTER PARTES REEXAMINATION CERTIFICATE (0329th)
United States Patent
Haraldsson et al.

(10) Number: US 7,500,796 C1
(45) Certificate Issued: Dec. 6, 2011

(54) ACCESSORY FOR A CAMERA BODY AND A CAMERA BODY WITH DETECTION AND INITIATION OF THE STATUS OF ATTACHED ACCESSORIES

(75) Inventors: Roland Haraldsson, Kungsbacka (SE); Tommy Killander, Göteborg (SE); Stefan Lundgren, Göteborg (SE)

(73) Assignee: Victor Hasselblad AB, Gothenburg (SE)

Reexamination Request:
No. 95/000,452, Mar. 10, 2009

Reexamination Certificate for:
Patent No.: 7,500,796
Issued: Mar. 10, 2009
Appl. No.: 10/527,266
Filed: Mar. 9, 2005

(22) PCT Filed: Sep. 8, 2003
(86) PCT No.: PCT/SE03/01386
§ 371 (c)(1),
(2), (4) Date: Mar. 9, 2005
(87) PCT Pub. No.: WO2004/023207
PCT Pub. Date: Mar. 18, 2004

(51) Int. Cl.
*G03B 17/00* (2006.01)

(52) U.S. Cl. .......... 396/529; 348/300; 348/375; 396/439; 396/544

(58) Field of Classification Search .......... None
See application file for complete search history.

(56) References Cited

To view the complete listing of prior art documents cited during the proceeding for Reexamination Control Number 95/000,452, please refer to the USPTO's public Patent Application Information Retrieval (PAIR) system under the Display References tab.

*Primary Examiner* — Pia Tibbits (57) ABSTRACT

The invention relates to a camera body (CB) for still photography that comprises attachment facilities for a number of different accessories (ACC), which camera body further comprises a control unit for controlling functions in the camera body and in accessories attached to the camera body. The control unit communicates with the various accessories via a data bus, and, for at least one of the attachment facilities for accessories, in addition to the data bus, the camera body comprises separate means for communication (1, 2, 3, 4, 5) for detecting accessories that are attached or removed, which means for communication can also be used by the control unit in the camera body to initiate a change in the system status of an attached accessory. The invention also relates to an accessory for such a camera body.

AMENDED

FIG.1

FIG. 2

AMENDED

FIG. 3

AMENDED

FIG. 4

AMENDED

FIG 5

US 7,500,796 C1

INTER PARTES REEXAMINATION CERTIFICATE ISSUED UNDER 35 U.S.C. 316

THE PATENT IS HEREBY AMENDED AS INDICATED BELOW.

THE DRAWING FIGURES HAVE BEEN CHANGED AS FOLLOWS:

Empty boxes in FIGS. 1-5 were labeled.

AS A RESULT OF REEXAMINATION, IT HAS BEEN DETERMINED THAT:

Claims 1 and 2 are cancelled.

* * * * *